Jan. 30, 1962  G. A. PAGONIS  3,018,789
VALVE
Filed Dec. 31, 1959  2 Sheets-Sheet 1

INVENTOR.
George Aristos Pagonis
BY
Bacon & Thomas
ATTORNEYS

Jan. 30, 1962   G. A. PAGONIS   3,018,789
VALVE
Filed Dec. 31, 1959   2 Sheets-Sheet 2
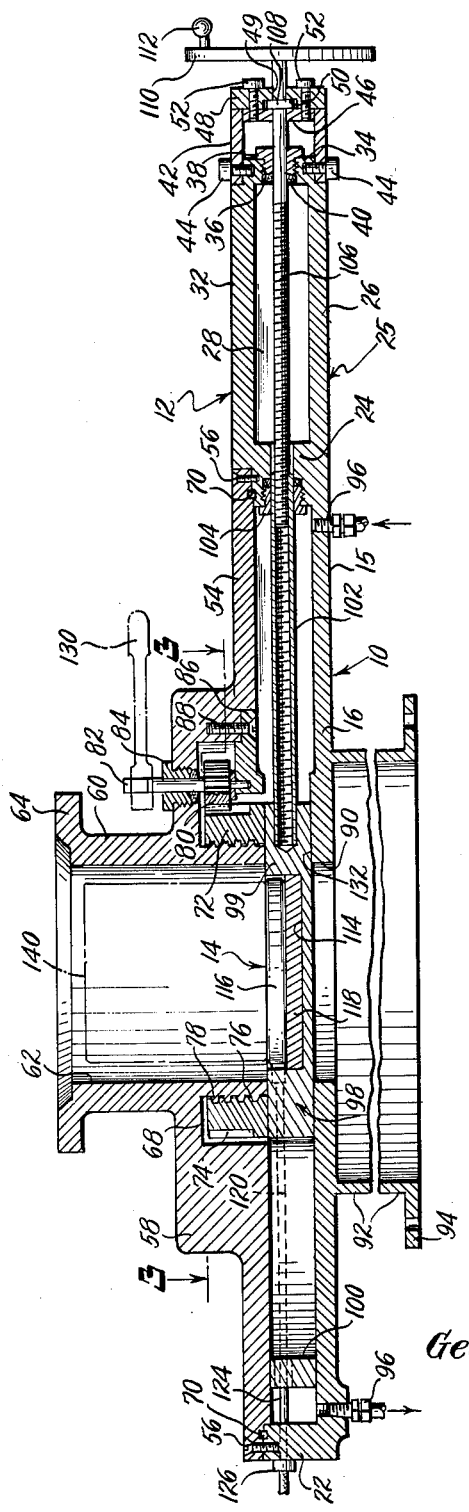
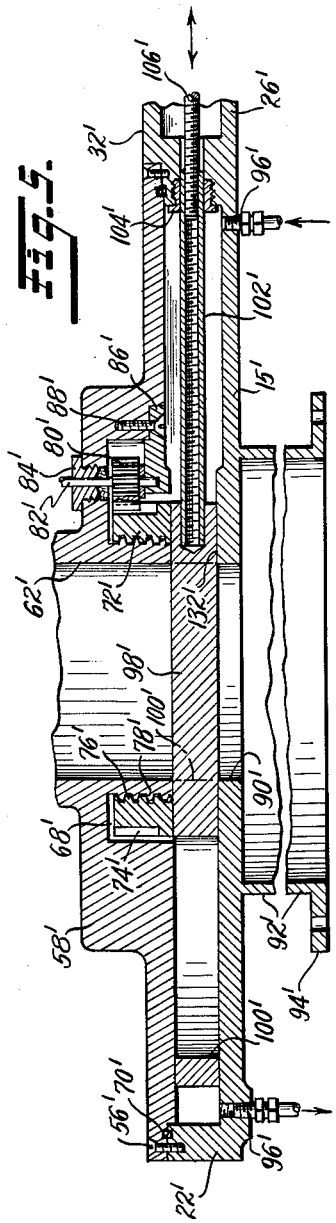
INVENTOR
George Aristos Pagonis
BY
Bacon & Thomas
ATTORNEYS

United States Patent Office 3,018,789
Patented Jan. 30, 1962

3,018,789
VALVE
George Aristos Pagonis, San Jose, Calif., assignor to Light Metals Research Laboratory, Inc., San Jose, Calif.
Filed Dec. 31, 1959, Ser. No. 863,289
11 Claims. (Cl. 137—341)

This invention relates to a novel valve structure, and more specifically to a valve structure adapted for use in connection with vacuum equipment employed, for example, in metallurgical melting, treating and refining operations.

While not so limited, the valve structure finds particular use as a loading valve for an inductively heated crucible in a system of the type disclosed in my co-pending application Ser. No. 505,887, filed on May 4, 1955, now abandoned, for a Process and Apparatus for Treating Titanium and Other Metals. In such a system, a charge of sponge metal, ingot or scrap, is charged into a sealed crucible wherein it is inductively heated under controlled conditions to produce commercially pure titanium, or commercially pure titanium and alloying metals may be charged into a sealed crucible for inductive heating to produce alloys of titanium.

In the system disclosed in the earlier-filed application mentioned above, the heating must take place in an inert atmosphere or vacuum because of the affinity of the high-temperature metal for certain gases found in the ambient air. It is necessary, therefore, to tightly seal the crucible to prevent the entry of ambient air. Fluid tight seals must be provided at the valves in the charging and discharging passages. This presents a problem, as it is not feasible to employ conventional sealing means because of the high temperatures involved, in which the crucible may be heated to a temperature in the neighborhood of 3000° F. In the process disclosed in said application Ser. No. 505,887, it is sometimes desirable to preheat and vacuum-degasify certain materials before being fed into the crucible, and the valve may be used to separate a preheating chamber from the main crucible chamber and to retain materials while they are pretreated.

The valve may also be used to alternately seal a crucible chamber containing molten metal and to connect such chamber to a source of vacuum. Most conventional gate valves when opened leave the interior of the valve housing open, thus exposing the groove, channel or other valve-guiding means for the gate to any fluid passing through the valve. In application of vacuum in metallurgical processes, particularly where high temperatures are used, there are always vapors passing through the valve when the valve gate is in open position, and there is ever-present the danger of the vapors condensing in the housing to form a metallic residue or film on the exposed parts and especially at the channel and seat of the gate element, thereby interfering with the valve operation and causing an imperfect seal.

Accordingly, an object of this invention is to provide a novel valve wherein the interior of the valve housing is sealed from vapors passing through the valve, thereby eliminating the danger of vapor condensation.

Another object of the invention is to provide a valve of the type described, wherein the sealing pressure for sealing the interior of the valve housing may be released before the gate element is moved, thereby reducing friction and wear.

Another object of this invention is to provide a novel valve, which, in its opened or closed position, can be tightly sealed to prevent the entrance of gases or vapors from either side of the gate element into the interior of the valve housing.

It is another object to provide a novel valve which can form a tight seal in a conduit or passage without using conventional packing or sealing rings.

It is a further object to provide a novel slide valve which is movable in one direction from an opening to a closing position, and vice versa, and which is movable in a direction at right angles thereto for sealing and unsealing.

Another object of the invention is to provide a valve of the type described wherein the valve sealing mechanism may be cooled by flow of inert gases through the valve housing.

It is a still further object of the invention to provide a novel valve having heating means in combination therewith for preheating material prior to delivery therethrough.

With the foregoing and other objects in view which will appear in the following specification, the invention resides in the novel combination and arrangement of parts and/or the details of construction hereinafter described and claimed, and illustrated in the accompanying drawings, in which:

FIG. 2 is a vertical, sectional view on the line 2—2 of FIG. 1, drawn to a larger scale;

FIG. 5 is a vertical, sectional view, similar to FIG. 2, of a modified form of valve without the heating element, the gate being in the open position.

Figure 1:
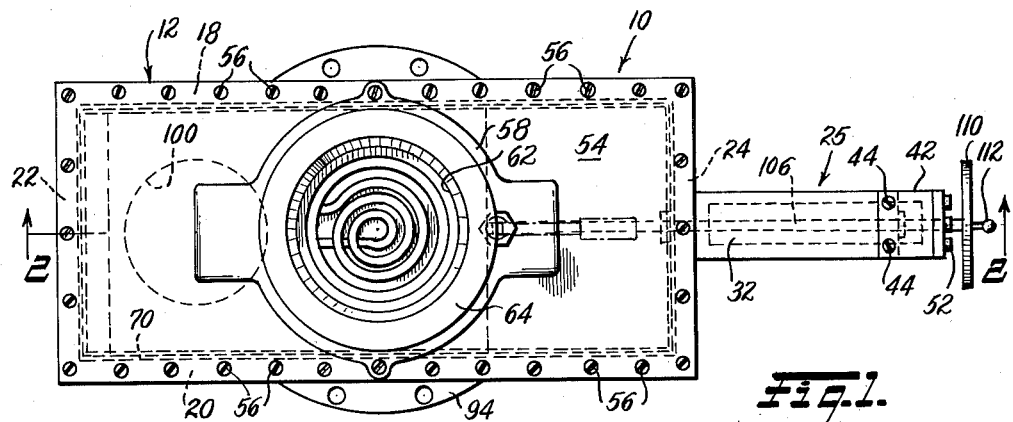
FIG. 1 is a plan view of one form of the valve wherein the movable valve element is provided with a heating means.
Figure 3:
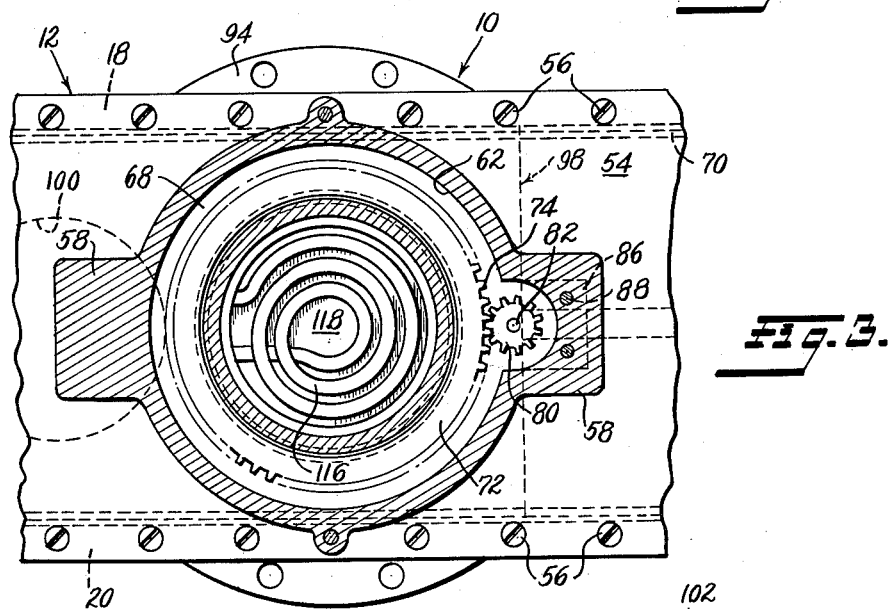
FIG. 3 is a horizontal, sectional view on the line 3—3 of FIG. 2, illustrating the mechanism for sealing the valve.

Referring to the drawings, in which the same reference numeral is employed throughout the various figures to designate corresponding parts, the valve structure, generally designated by the numeral 10, comprises a valve housing 12 enclosing a movable valve member 14.

The valve housing 12 comprises a base 15 of generally rectangular form, having a bottom wall 16, a first pair of spaced side walls 18 and 20, and a second pair of spaced side walls 22 and 24, forming an open box-like structure. An extension or valve stem housing 25 is formed integrally with the wall 24, and comprises a bottom wall 26, side walls 28 and 30, a top wall 32 and an end wall 34, constituting a hollow tubular structure of square cross section. The end wall 34 is provided with a threaded opening 36 to receive a stuffing box including a packing nut 38 and packing 40. A stem bracket 42 is mounted on the upper end of the extension, being secured thereto by cap screws 44 passing through openings in the skirt of the stem bracket and into threaded openings in the sides of the end wall 34. The end wall 46 of the stem bracket 42 has a central opening therein for the passage of a valve stem as will be described hereinafter. A stem plate 48 overlies the end wall 46, and has a central opening 49 therein adapted to register with the opening in the end wall 46. The stem plate 48 is made in two parts to facilitate assembly. Opening 49 is counterbored at 50 to provide a recess for a purpose to be described hereinafter. The stem plate 48 is secured to the end wall 46 by a plurality of cap screws 52.

The open top of the box-like base 15 is closed by a closure plate 54 of rectangular form, which is held in place by a plurality of screws 56. Closure plate 54 is provided with a hollow boss 58 which is integral with a conduit 60, having a flange 64 adapted to be connected to another conduit or to some other structure, or to receive a cover member (not shown). The conduit and boss are provided with a central opening 62. An annular chamber 68 concentric with the opening 62 is formed in the boss 58. A sealing ring 70 is placed between the closure plate 54 and the base 15 to provide a fluid-tight seal.

A lock gear ring 72 is disposed within the annular chamber 68, and has, on the periphery thereof, a ring of external teeth 74. Lock gear ring 72 is internally threaded at 76 to cooperate with external threads 78 on the inner wall of the annular chamber. It is seen, from this structure, that rotation of the lock gear ring produces an axial movement thereof in a direction parallel to the axis of the conduit 60. A pinion 80, integral with a shaft 82 and positioned in a recessed portion of annular chamber 68, engages the external teeth 74 on the lock gear ring 72 to produce rotation of the latter. The shaft 82 has bearing within a packing nut 84, which is positioned in an opening in the top of the boss 58, and its inner end is rotatably supported in a bearing carried by a bearing member 86, secured to the boss 58 by screws 88.

The base 15 has an opening 90 therein of the same diameter and in axial alignment with the opening 62 in conduit 60. A conduit 92 is formed integrally with the base 15 and coaxially with the opening 90 therein. The conduit 92 has a flange 94 on one end thereof, whereby it can be attached to another conduit, to the top of a crucible, or to any other structure. The diameter of the conduit 92 is greater than the diameter of the conduit 60 to accommodate heat insulation when the conduit 92 is attached to a wall of a crucible. The upper and lower ends of the base 15 are bored to receive pipe fittings 96 to which a source of vacuum and/or a source of inert gas may be connected, in order to evacuate the sealed portion of the valve housing or to introduce therein an atmosphere of inert gas, as may be desired. Inert gas for cooling purposes as well as for exclusion of atmospheric contaminants may be introduced into one side of the valve housing and out of the other.

Figure 4:
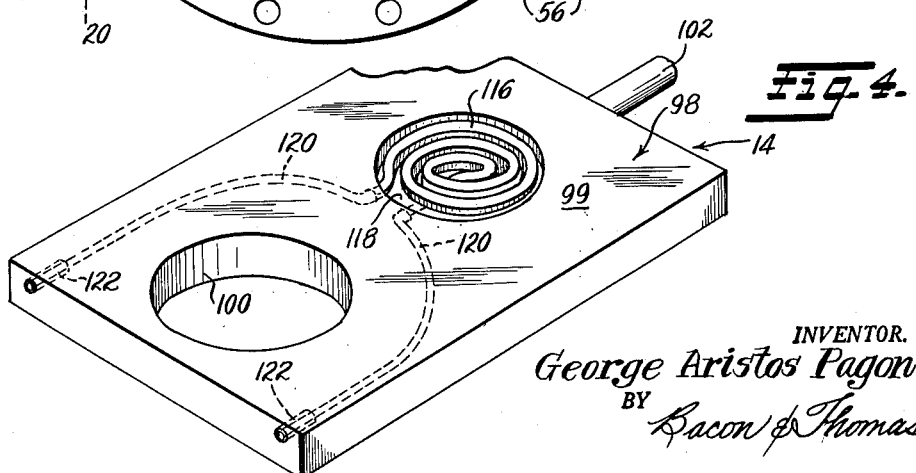
FIG. 4 is a perspective view of the movable valve element of FIG. 1.

Referring to FIGS. 2 and 4, the movable member 14 comprises a rectangular valve body 98 having a solid portion 99 on one end thereof, and an opening 100 in the other end. The opening 100 has a diameter equal to the diameter of the opening 62 in conduit 60 and the opening 90 in the base 15, so that when the valve body 98 is moved to a position in which the opening 100 is aligned with the conduit 62 and the opening 90, an uninterrupted flow passage will be provided. A valve stem is connected to one end of the valve comprising a hollow internally threaded tubular member 102, which is non-rotatably connected to one end of the valve body 98. The end of the valve stem 102, remote from the valve body, passes through a packing nut 104, which serves to seal the interior of the valve housing. A feed screw 106 cooperates with the threaded interior of the valve stem 102, for the purpose of opening and closing the valve. Feed screw 106 includes an integral collar 108, adapted to be rotatably received within the recess 50, to prevent axial movement of the feed screw while permitting rotatable movement thereof. The end of the feed screw extends through the aligned opening in the end wall 46 and the stem plate 48, and is provided, on its outer end, with a handwheel 110 and a knob 112 by which the feed screw 106 can be rotated.

In the embodiment shown in FIGS. 1–4, one face of the solid portion 99 of the valve body 98 is recessed at 114 to receive an electric heating coil 116. This coil, which may be similar to that of an electric stove, rests on an alumina insulating disc 118. Electrical conductors 120 are connected to the opposite ends of the heating coil 116 and extend through a channel in the body portion 98 on opposite sides of the aperture 100 to a pair of female connectors 122. The side wall 22 of the base 15 receives a pair of male connectors 124, aligned with the female connectors 122 and co-operable therewith to form an electric contact when the slide valve element 98 is in its closed position, as shown in FIG. 2. The recess 114 is so located that the heating element, when the valve is in its closed position, lies at the bottom of the opening 62.

That end of the shaft 82 which extends outside the packing nut 84 has a noncircular head, which is adapted to receive a ratchet handle 130, by which the pinion 80 can be rotated in either direction to produce an axial inward or outward traverse of the lock gear ring 72. Inward travel of the lock ring causes it to contact valve body 98, forcing it downwardly against its seat. Outward movement unlocks the valve body so that it can be moved.

The inner surface of the bottom wall 16 of base 15, surrounding the opening 90, forms a valve seat for the body member 98. This surface, as well as the surface of the valve body 98 which faces the valve seat, are provided with a very smooth and plane finish to permit these parts, when forced together by lock ring 72, to form a fluid-tight seal without the assistance of any other sealing means.

The valve body 98 has a width substantially equal to the width separating the side walls 18 and 20 of the base 15, and a thickness substantially equal to the distance between the inner end of the conduit 60 and the surface of a valve seat 132. The lower wall of the valve housing 12 thereby provides a guide structure for the movable valve member 14, having a fit permitting relatively easy operation of the movable valve member 14 within the valve housing 12.

The valve structure is assembled as follows: The shaft 82 of the pinion 80 is passed through its opening in the boss 58, and the packing nut 84 is screwed in place to support the pinion. The bearing member 86 is then positioned, with its bearing portion over the inner end of the shaft 82, and secured in place by the screws 88. The lock gear ring 72 may then be threaded on the threads 78 on the inner wall of annular chamber 68. The valve body 98 is placed in the base 15, with the heating element recess 114 disposed in a direction away from the opening 90. The packing nut 104 is slipped over the outer end of the threaded sleeve 102, the sleeve being passed into the opening in the upper wall 24, and the packing nut 104 being then tightened in position. With the sealing ring 70 in position in its grooves, the closure plate 54 can be secured to the base by the screws 56. The threaded stem of the feed screw 106 is passed through the opening in the top wall 46 of the stem bracket 42, and the stem plate 48, which is made in two parts, is placed with its recess 50 about the collar 108 and secured by the screws 52. The feed screw 106 is then passed through the packing nut 38 and into engagement with the internally threaded sleeve 102, thus bringing the lower end of the stem bracket 42 into engagement with the shoulder on the outer end of the extension 25, to which it is secured by the screws 44. The pipe fittings 96 may then be screwed into the threaded receiving openings.

In use, the valve, as shown in FIG. 2, would be horizontally disposed between two sections of a closed system. Thus, the valve may be disposed above a crucible or the like to which materials are to be added from a charging section. For example, the valve may be used for addition of and preheating of a cartridge 140 containing scavenging or alloying elements for molten metal contained in an underlying crucible. During the heating period, in which current would be passed through coils 116 by means of conductors 126 and external controls (not shown), the opening 90 is sealed by forcing the valve body 98 against the valve seat 132 by means of the locking ring 72, the ratchet handle 130 being rotated for this purpose. The conduit opening 62 is sealed from the interior of the valve housing by contact of the bottom of the locking ring with the top surface of the valve body and by contact of the threads of the ring with the threads on the interior of annular space 68. Inert gas, such as helium or argon, may be introduced through the right-hand fitting 96 so as to flow over and cool the sleeve 102 and ratchet mechanism and then pass along the outer edges of the valve body 98 and out through the left-hand fitting 96. The inert gases may also pressurize the interior of the valve housing to help prevent leakage of gases outward from the valved conduits into such housing, as well as to prevent entrance of ambient gases from the atmosphere.

In operation, to open the valve the ratchet handle 130 can be oscillated to cause rotation of the pinion 80 to produce a backing off of the lock gear ring 72 from the valve body 98. The handwheel 110 can then be rotated in a clockwise direction, whereby the feed screw 106 will move the movable valve member 14 from the position shown in FIG. 2 into a position in which the solid portion 99 occupies the previously unoccupied portion of the base 15, to the right as shown in FIG. 2, and the opening 100 in the valve body is brought into registry with the opening 62 and the opening 90. The initial outer movement causes a separation of the connectors 122 and 124, thus breaking the electrical connection with the heating element 116. In the open position of the valve, any additive material, such as the cartridge 140, will drop through the registering openings 52, 100 and 90.

In the open position, the ratchet handle 130 can be oscillated to produce rotation of the pinion 80 in a direction to cause an advance movement of the lock gear ring 72 against the valve body 98, thereby forcing the smooth surface on the bottom of the valve body against the smooth surface of the valve seat 132. This again assures that there will be no leakage of gases from the connected conduits into the valve housing, or conversely, from the valve housing into the conduits. Inert gases may be introduced during this stage through fittings 96, as previously described. In the open position, gases and vapors may be withdrawn from the underlying crucible, and pressure conditions may be varied in any desired manner.

When it is desired to close the valve, the lock gear ring 72 is backed away from the valve body by manipulation of the ratchet handle 130, and the handwheel 110 may be rotated in a counterclockwise direction to close the valve, as shown in FIG. 2. As the valve reaches its closed position, the connectors 122 and 124 are again brought into engagement to re-establish an electrical circuit through the heating coil 116. In the closed position, the ratchet handle 130 may again be manipulated to advance the lock gear ring 72 to its sealing position, affording a tight fluid seal between the valve body and the valve seat.

FIG. 5 illustrates a modified form of construction in which the heating element and its electrical connection are omitted. Corresponding parts are designated by the same reference numerals which are primed. The method of assembly and operation is substantially the same. The valve may be either horizontally or vertically disposed.

From the foregoing, it is evident that I have devised a novel form of valve structure which is eminently suitable for control of feed or flow through a conduit wherein it is desired to provide a fluid-tight seal without the employment of conventional sealing rings and/or equivalent structure, and which finds especial use in connection with the high temperature treatment of metals and other materials in a closed system wherein it is desired to exclude atmospheric contaminants.

Having fully described my invention, it is to be understood that I do not wish to be limited to the details herein set forth, but that my invention is of the full scope of the appended claims.

I claim:

1. A valve structure comprising: a valve housing including a flow passage; a valve seat surrounding said flow passage; a slide valve having a solid portion and an apertured portion; means for moving said valve from a position in which the solid portion registers with the valve seat and the apertured portion is remote therefrom, and vice versa; means guiding said slide valve in a plane parallel to said valve seat; and a heating element carried by said solid portion in a position to register with said flow passage when the slide valve is in its closing position.

2. A valve structure according to claim 1, including a recess in the solid portion of the slide valve receiving said heating element, said recess being in a wall of said slide valve opposite said valve seat engaging wall.

3. A valve structure according to claim 1, in which said heating element comprises an electric coil.

4. A valve structure according to claim 3, wherein said electric coil is connected to contacts at an end of said slide valve and said valve housing is provided with mating contacts, said contacts engaging when the slide valve is in its closed position, and disengaging in any other position.

5. A valve structure comprising: a valve housing having cylindrical inlet and outlet openings in axial alignment providing a flow passage; a slide valve disposed in said valve body for movement transversely between said inlet and outlet openings to opened and closed positions and said valve body having a valve chamber accommodating such movement, said slide valve comprising a solid portion closing said openings in the closed position of said valve and having a cylindrical aperture registering with said openings in the open position of said valve; a valve stem connected to said slide valve and to valve operating means externally of said valve body, said valve chamber being sealed from the atmosphere; said valve housing having an annular chamber concentric with one of said openings and opening into said valve chamber on one side of said slide valve; a ring gear disposed in said annular chamber in threaded engagement with one wall thereof; means extending externally of said valve body for rotating said ring gear on its threads to thereby move it into sealing engagement with said slide valve and to force said slide valve against its seat thereby sealing the valve chamber from the inlet and outlet openings.

6. The valve structure defined in claim 5 wherein means are provided for introduction and withdrawal of gases into and from the valve chamber.

7. The valve structure defined in claim 5, wherein the valve stem includes a sleeve portion disposed within an extension of the valve chamber and wherein said extension is provided with an inlet opening and said valve body is provided with an outlet opening for flow of cooling gases along the valve stem and over the valve operating and sealing mechanism.

8. A valve structure, comprising: a valve housing including means defining a flow passage; a valve seat surrounding said flow passage; a slide valve having an opening and an imperforate portion, means moving said slide valve between an open position in which the opening is aligned with said flow passage and a closed position in which the imperforate portion is aligned with said flow passage; guide means restraining movement of said slide valve in a plane parallel with said valve seat and transversely of said flow passages, said guide means maintaining said slide valve in contact with the valve seat; and means, including a threaded lock gear ring surrounding said flow passage, and other means producing a rotary and axial movement of said lock gear ring including stationary threads carried by said means defining a flow passage, acting on said valve, transversely of its direction of opening and closing movement, forcing the valve against the valve seat and sealing the interior of the valve housing from the flow passage.

9. A valve structure, comprising: a valve housing including means defining a flow passage; a valve seat surrounding said flow passage; a slide valve having an opening and an imperforate portion, means moving said slide valve between an open position in which the opening is aligned with said flow passage and a closed position in which the imperforate portion is aligned with said flow passage; guide means restraining movement of said slide valve in a plane parallel with said valve seat and transversely of said flow passages, said guide means maintaining said slide valve in contact with the valve seat; and means acting on said slide valve, transversely of its direction of opening and closing movement, forcing the valve against the valve seat and sealing the interior of the valve housing from said flow passage, including a lock gear ring in an annular space surrounding said flow passage, a wall of said annular space and said lock gear ring having cooperating threads, and means rotating said lock gear ring, whereby the lock gear ring is given a rotary and axial movement toward and away from said slide valve.

10. A valve structure according to claim 9, in which the cooperating threads are on an internal wall of said annular space and internally of the lock gear ring, and in which the means to rotate the lock gear ring includes a pinion and external teeth on the lock gear ring.

11. A valve structure, comprising: a valve housing including means defining a flow passage; a valve seat surrounding said flow passage; a slide valve having an opening and an imperforate portion, means moving said slide valve between an open position in which the opening is aligned with said flow passage and a closed position in which the imperforate portion is aligned with said flow passage; guide means restraining movement of said slide valve in a plane parallel with said valve seat and transversely of said flow passages, said guide means maintaining said slide valve in contact with the valve seat; means acting on said slide valve, transversely of its direction of opening and closing movement, forcing the valve against the valve seat and sealing the interior of the valve housing from said flow passage; and a heating element supported in the imperforate portion of said slide valve in such position to register with the flow passage when the slide valve is in its closed position.

References Cited in the file of this patent

UNITED STATES PATENTS

| | | |
|---|---|---|
| 2,231,614 | Burke | Feb. 11, 1941 |
| 2,316,933 | Chaplin | Apr. 20, 1943 |
| 2,340,499 | Zachow | Feb. 1, 1944 |

FOREIGN PATENTS

| | | |
|---|---|---|
| 104,845 | Great Britain | Mar. 22, 1917 |
| 10,346 | Germany | Feb. 9, 1956 |